United States Patent [19]

Baker et al.

[11] 4,166,520
[45] Sep. 4, 1979

[54] PROTECTIVE ELASTOMERIC BRAKE ROD SEALING BOOT

[75] Inventors: Thomas B. Baker; Edward H. Sittner, both of St. Charles, Mo.

[73] Assignee: ACF Industries, Incorporated, New York, N.Y.

[21] Appl. No.: 842,514

[22] Filed: Oct. 17, 1977

[51] Int. Cl.² .................... B61H 13/34; F16D 3/84; F16D 65/00; F16J 15/56
[52] U.S. Cl. .................... 188/33; 74/18.2; 92/168; 105/1 A; 105/413; 105/418; 188/205 A; 277/97; 277/212 FB
[58] Field of Search ............... 105/1, 413, 418; 64/23, 64/23.5, 32 F; 74/18.2; 92/167, 168; 188/33, 197, 205 A, 207; 277/17, 24, 97, 152, 153, 212 FB

[56] References Cited

U.S. PATENT DOCUMENTS

| 12,166 | 1/1855 | Miller | 74/18.2 X |
| 2,750,746 | 6/1956 | Brannen | 74/18.2 X |
| 2,788,865 | 4/1957 | Kolesa | 188/33 |
| 2,993,712 | 7/1961 | Hocker | 277/97 |
| 3,830,083 | 8/1974 | Hadick et al. | 277/212 FB X |

*Primary Examiner*—Stephen G. Kunin
*Assistant Examiner*—Howard Beltran
*Attorney, Agent, or Firm*—Henry W. Cummings

[57] ABSTRACT

In a railway freight car an elastomeric boot is attached to the entrance and/or exit of a hollow sill or hollow structural member through which a brake rod passes. The brake rod passes through a brake rod opening in the boot in entering and/or leaving the sill or structural member, and the boot engages the brake rod sufficiently to substantially prevent moisture from passing through the boot and into the sill or structural member.

4 Claims, 12 Drawing Figures

PROTECTIVE ELASTOMERIC BRAKE ROD SEALING BOOT

BACKGROUND OF THE INVENTION

In railway freight cars having hollow side sills on opposite sides of the car, a brake rod has often been passed through one of the hollow side sills to transmit brake forces from one end of the car to the other. In service water will creep along the brake rod and into the hollow side sill, causing corrosion of the side sill and/or brake rod, and possible failure of the brake rod within the hollow side sill. A fabricated rain shield has been provided at each end of the sill to reduce or eliminate moisture entering the side sill by creeping along the brake rod, to reduce corrosion of the side sill to a negligible amount, and thus reduce or eliminate the need for periodic disassembly of the brake assembly to inspect the brake rod in the sill.

However this rain shield is an expensive item to fabricate and weld in place on the car on each end of the side sill through which the brake rod passes. Furthermore it has been found that even with fabricated rain shields in place at either end of the side sill, moisture still passes through the rain shield and creeps along the brake rod in the side sill causing corrosion of the brake rod, requiring periodic, though less frequent, disassembly of the brake assembly to inspect the brake rod in the side sill. Furthermore on some occasions moisture has collected within the metal rain shield and then frozen, freezing the brake lever in place. To free the brake lever has required thawing or pounding of the lever and/or housing.

Brake rods are also passed through hollow center sills, and through other hollow structural members, resulting in similar corrosion problems resulting from moisture.

SUMMARY OF THE INVENTION

In a railway freight car an elastomeric boot is attached to the entrance and/or exit of a hollow sill or hollow structural member through which a brake rod passes. The brake rod passes through a brake rod opening in the boot in entering and/or leaving the sill or structural member, and the boot engages the brake rod sufficiently to substantially prevent moisture from passing through the boot and into the sill or structural member. The elastomeric boot is made of elastomeric material which is strong and rugged and which has sufficient flexibility to allow the brake rod to move longitudinally and laterally during application and release of the brake, and sufficient stretching capability to allow expansion of the brake rod opening such that forks located at opposite ends of the brake rod having a diameter larger than the brake rod may pass through the brake rod opening without permanently deforming the elastomeric boot so that the brake rod opening in the elastomeric boot will return to its original diameter after one or both forks has passed through the brake rod opening. The elimination of the fabricated rain shield reduces the cost of the brake assembly for the car, and also reduces the weight of the car.

The Drawings

DESCRIPTION OF PREFERRED EMBODIMENT

Figure 1:
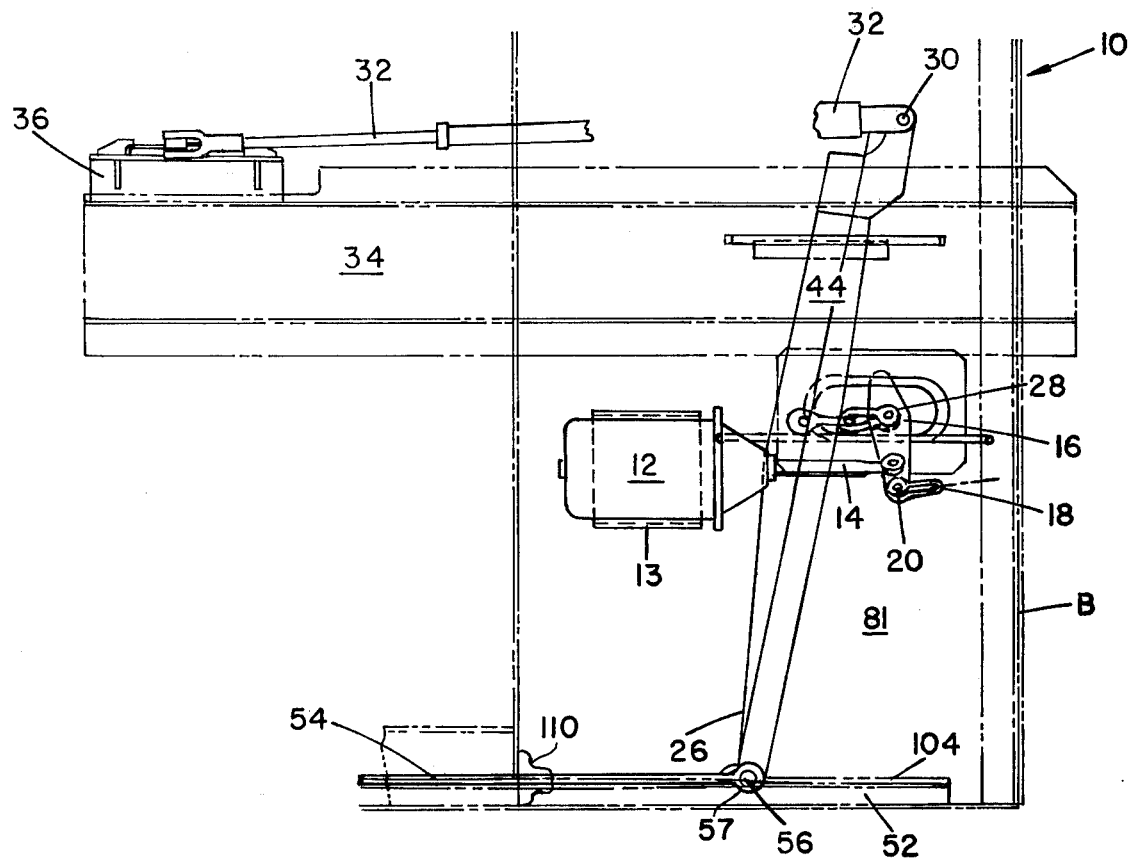
FIG. 1 is a partial plan view of the end of a railway car illustrating a known brake cylinder and brake lever arrangement located at the B end of the car and including an elastomeric boot of the present invention.
Figure 2:
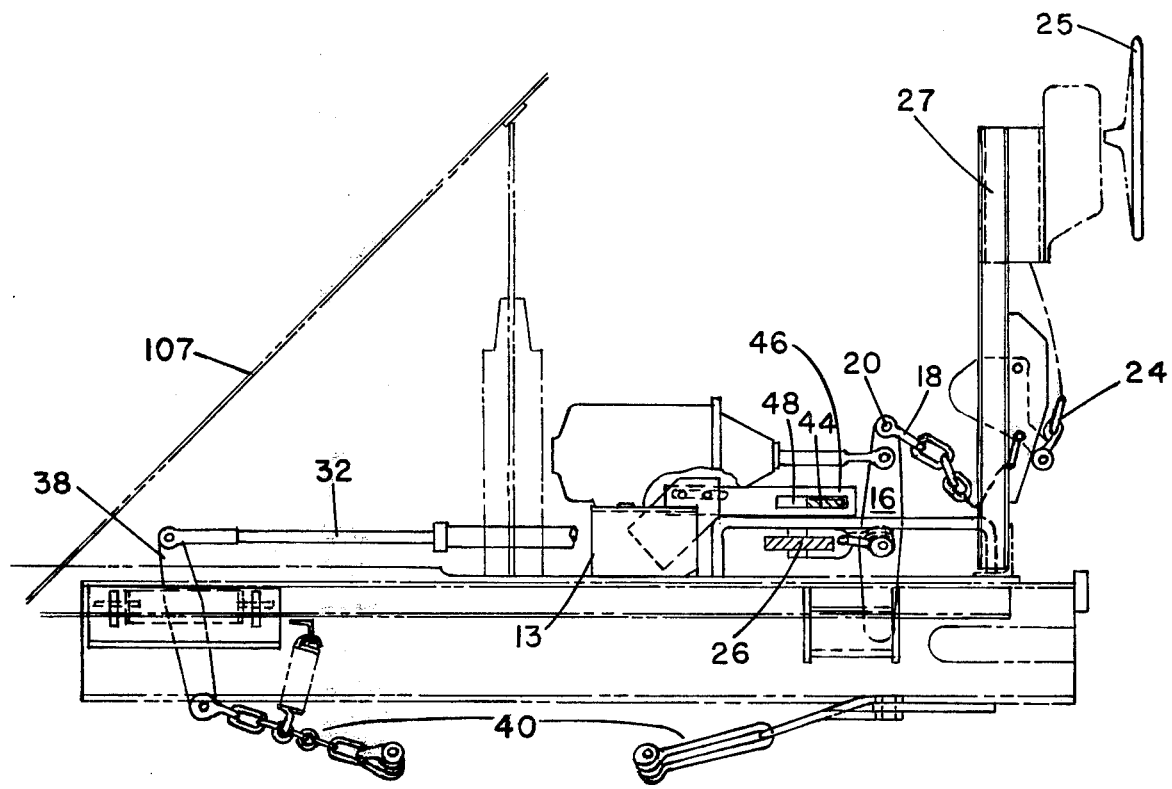
FIG. 2 is a side elevation view of the brake cylinder and lever arrangement of FIG. 1.
Figure 3:
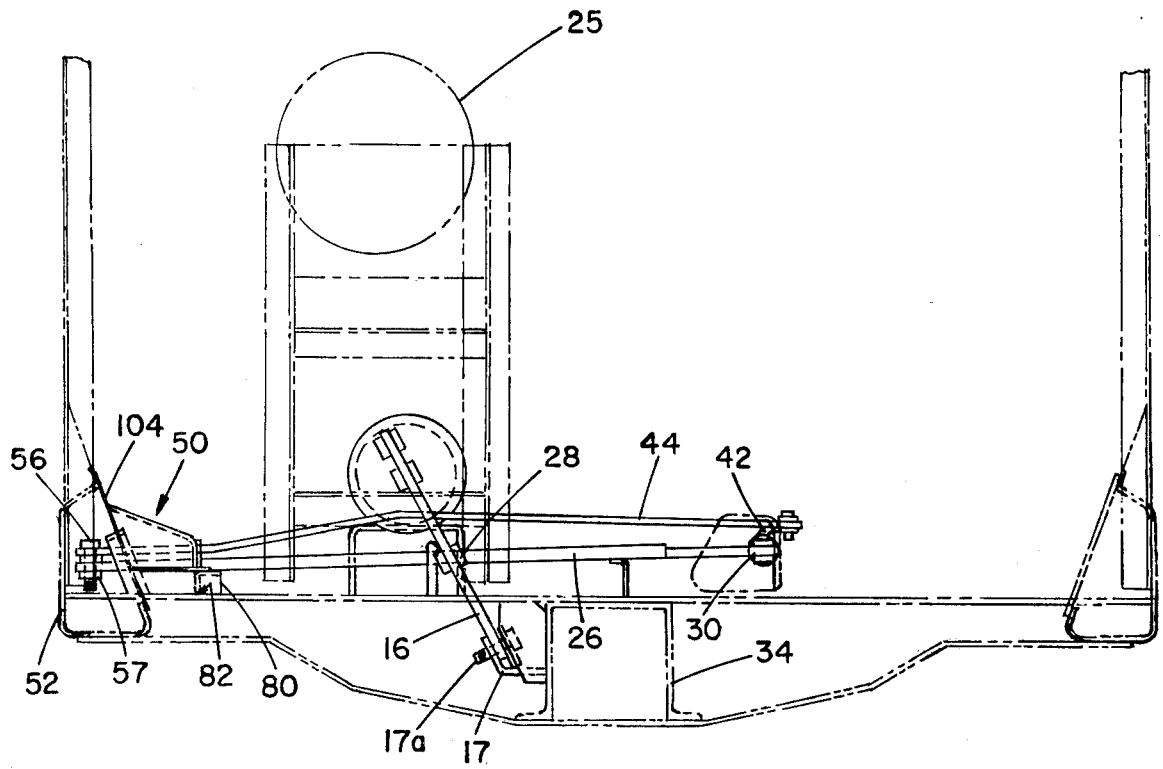
FIG. 3 is a end elevation view of the brake cylinder and lever arrangement shown in FIG. 1, also showing the fabricated rain shield of the prior art.

In one brake arrangement commonly utilized in a railway hopper car 10, a brake cylinder 12 is mounted on the B end of the car with a suitable cylinder bracket assembly 13. The brake cylinder has a piston rod 14 extending out of the cylinder which engages a generally vertically extending cylinder lever 16 (FIGS. 1, 2 and 3). A chain 24 from the hand brake 25 also is held in engagement with the vertical lever 16 by piston rod fork 18. A pin 20 passes through piston rod fork 18 and vertical lever 16. Rotation of the hand brake 25 will activate vertical lever 16 through the action of chain 24 in the usual manner.

Vertical lever 16 engages a horizontally extending cylinder lever 26 by means of clevis 28 located at about the mid point of vertical lever 16 (FIG. 3). The lower end of vertical lever 16 is rotatably mounted on center sill 34 with bracket 17 and pin 17a. A first end 30 of horizontal cylinder lever 26 engages a slack adjuster 32 (FIG. 1) of known construction which extends longitudinally of the car along the center sill 34 to a bracket 36 mounted upon the center sill. Slack-adjuster 32 is connected to a vertical brake lever 38 (FIG. 2) which applies the brakes to the B end of the car with a known brake linkage indicated generally by the numeral 40. Since such brake linkages are conventional it is not believed further discussion of this linkage is required.

Figure 6:
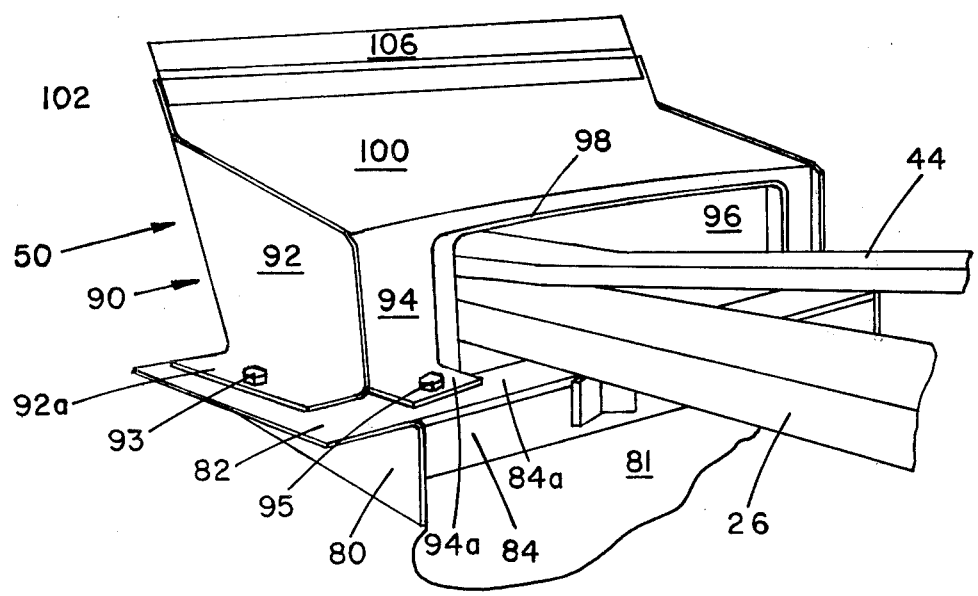
FIG. 6 is a perspective view of a fabricated rain shield of the prior art.

Horizontally extending lever 26 has mounted thereon a vertically extending finger arrangement 42 (FIG. 3) which engages a horizontally extending slack adjuster lever 44 which is supported by a bracket 46 mounted on cylinder bracket assembly 13 (FIG. 2). Bracket 46 includes a slot therein 48 through which slack adjuster lever 44 passes. A second end of horizontal lever 26 extends transversely of the car into an opening 51 in a first rain shield 50 (FIG. 6). Slack adjuster lever 44 also extends transversely toward rain shield 50 and is inclined downwardly as it extends toward side sill 52 and approaches the rain shield. Within the side sill 52 horizontal lever 26 and slack adjuster lever 44 are connected by means of a vertically extending pin 56 to a longitudinally extending brake rod 54 having a fork 57 that extends through the side sill (FIG. 3). Rod 54 has a diameter of about ⅞ inch, and forks 57 are about 2⅝ inches by 2⅜ inches.

Figure 4:
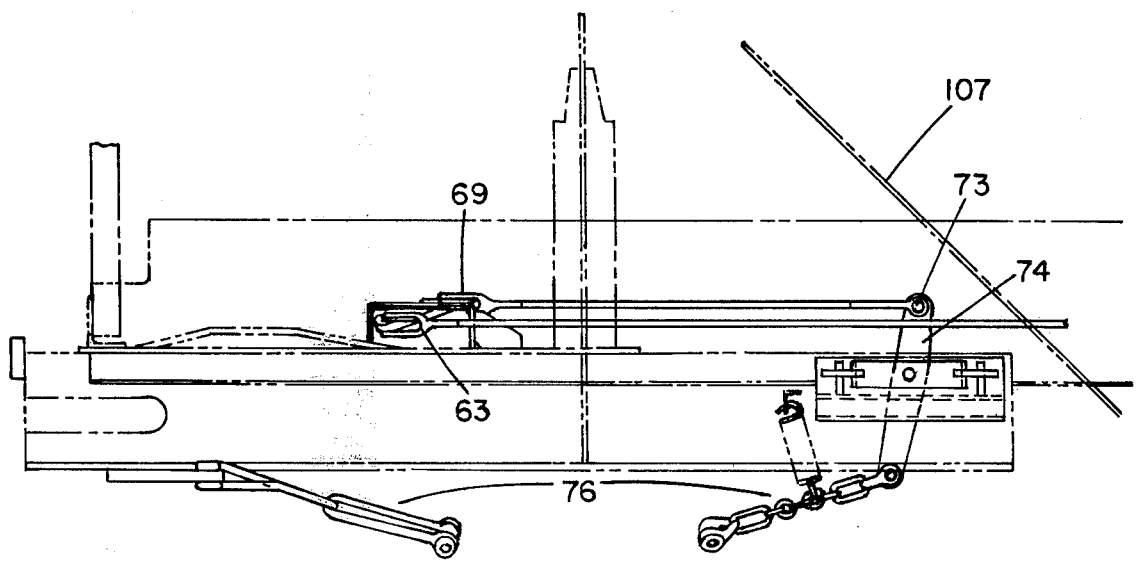
FIG. 4 is a side elevation view at the opposite A end of the car from FIG. 3 illustrating the brake levers at the A end of the car.
Figure 5:
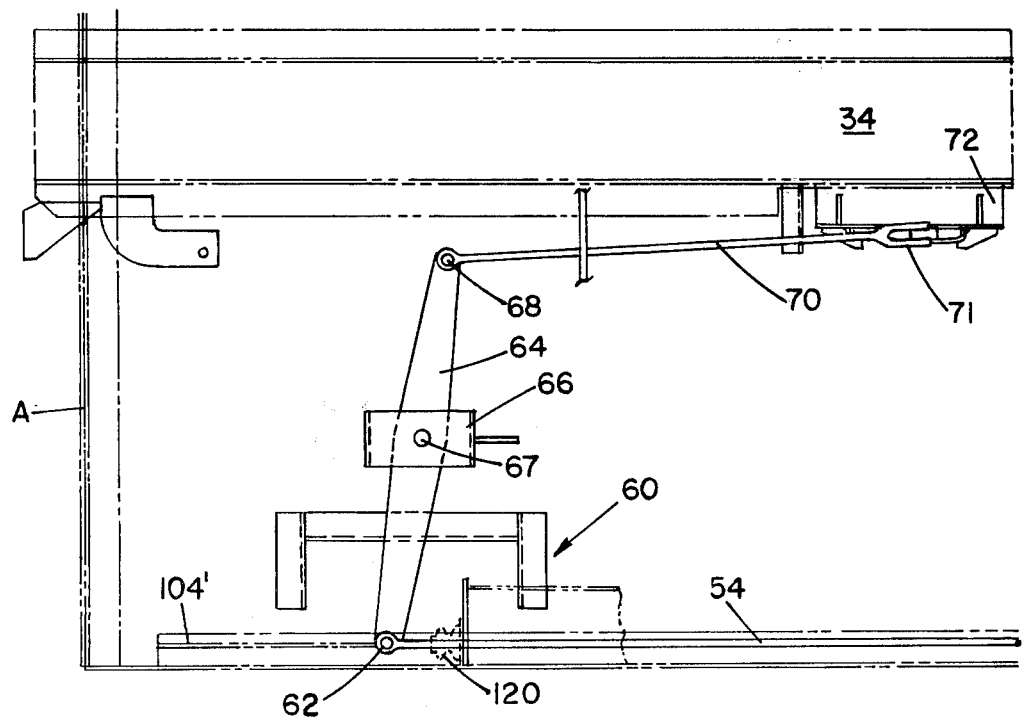
FIG. 5 is a partial plan view of the end of the car shown in FIG. 4 and illustrating a fabricated rain shield of the prior art at the A end of the car.
Figure 6A:
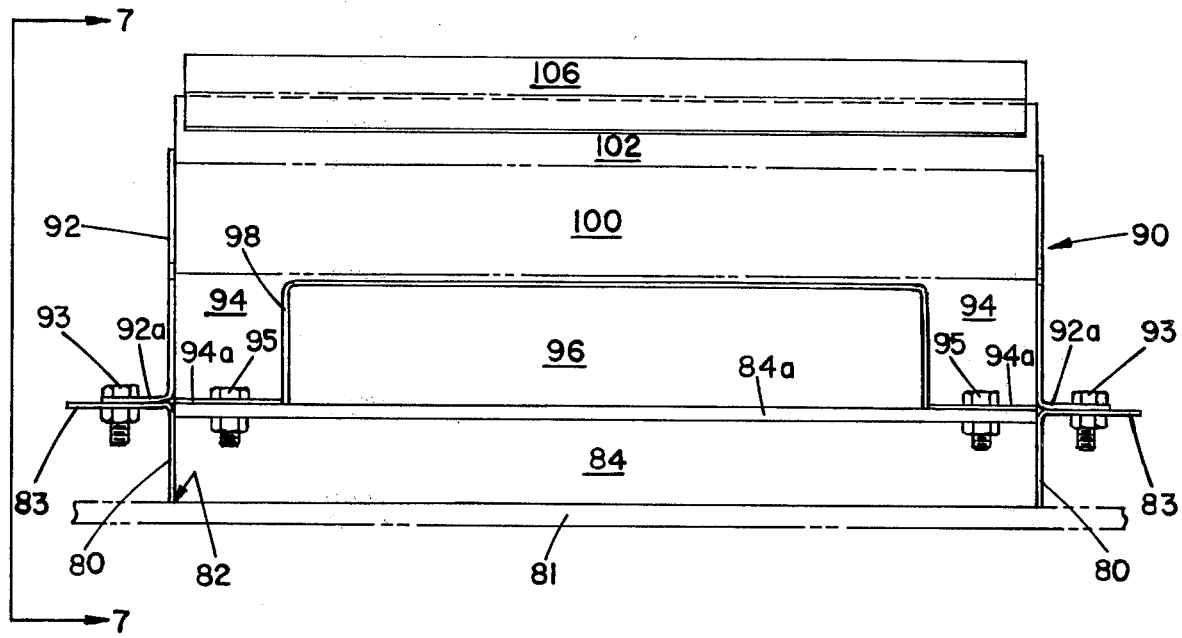
FIG. 6A is a front elevation view of the fabricated rain shield shown in FIG. 6.
Figure 7:
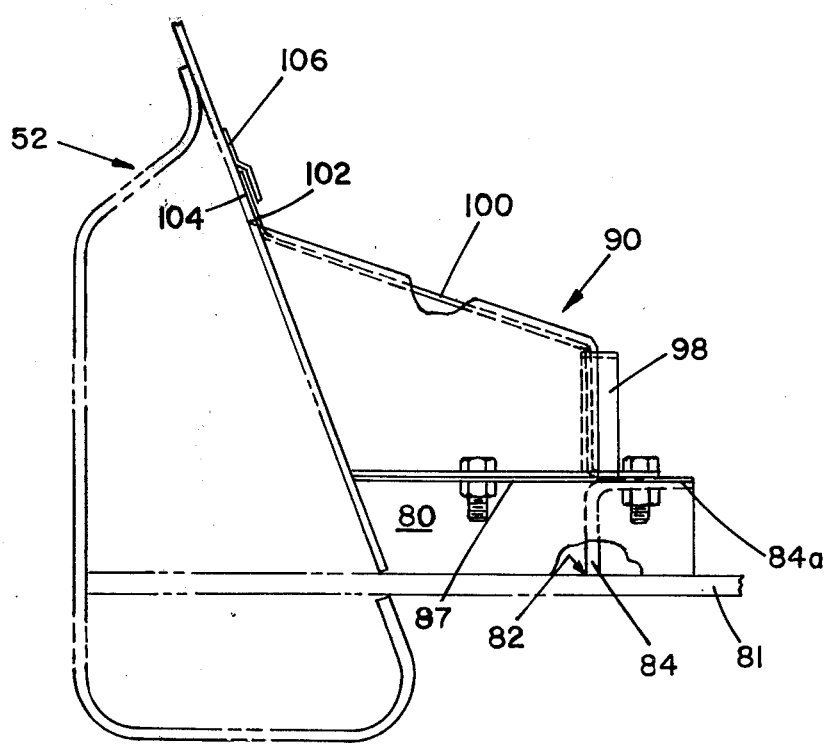
FIG. 7 is a side elevation view of the fabricated rain shield shown in FIG. 6.

Brake rod 54 extends through the side sill throughout the length of the car and exits from the side sill at the A end of the car into a second rain shield 60 at the opposite end of the side. A pin 62 passing through fork 63 at the far end of the brake rod 54 (FIGS. 4 and 5) connects brake rod 54 to a horizontal lever 64 pivotally mounted at 66 at its mid portion by a pin 67. Lever 64 is connected by means of pin 68 and form 69 to a longitudinally extending lever 70 which extends inwardly of the car to a bracket 72 mounted on the center sill 34. Lever 70 by means of fork 71 and pin 73 connects to a vertically extending lever 74 which applies the brakes to the A end of the car in a known manner by a brake linkage indicated generally at 76.

The amount of rain and moisture entering the side sill 52 is reduced by means of first and second rain shields 50 and 60.

Rain shields 50 and 60 are similar so that only one need be described. The rain shields include spaced rain shield bases 80 welded to the shear plate 81 at 82, and having outwardly extending flanges 83. A transverse gusset 84 is welded to base member 80 and to shear plate 81, and includes a front flange portion 84a. A formed rain shield closure 90 including vertical side portion 92, horizontal side portion 92a, front vertical portion 94, front horizontal portion 94a, and top portion 100, is attached to base flanges 82 and 84a with fasteners 93 and 95. An opening 96 is provided on front portion 94 to receive levers 26 and 44. A reinforcement 98 may be welded into opening 96. Top portion 100 has an extension 102 which extends within a strap 106 welded to plate 104 on the side sill.

It will be apparent that the material for rain shields 50 and 60, and the cost of forming the rain shield closure, and assembling the various parts is expensive. Furthermore the rain shields add weight to the car.

It also is to be noted at this point, that longitudinal plates 104, 104' extend from the end of the slope sheet 107 to each end of the car to near the end of the car, and is utilized to prevent rain and moisture from entering the side sill. Plates 104, 104' thus adds weight and expense to the car.

Figure 8:
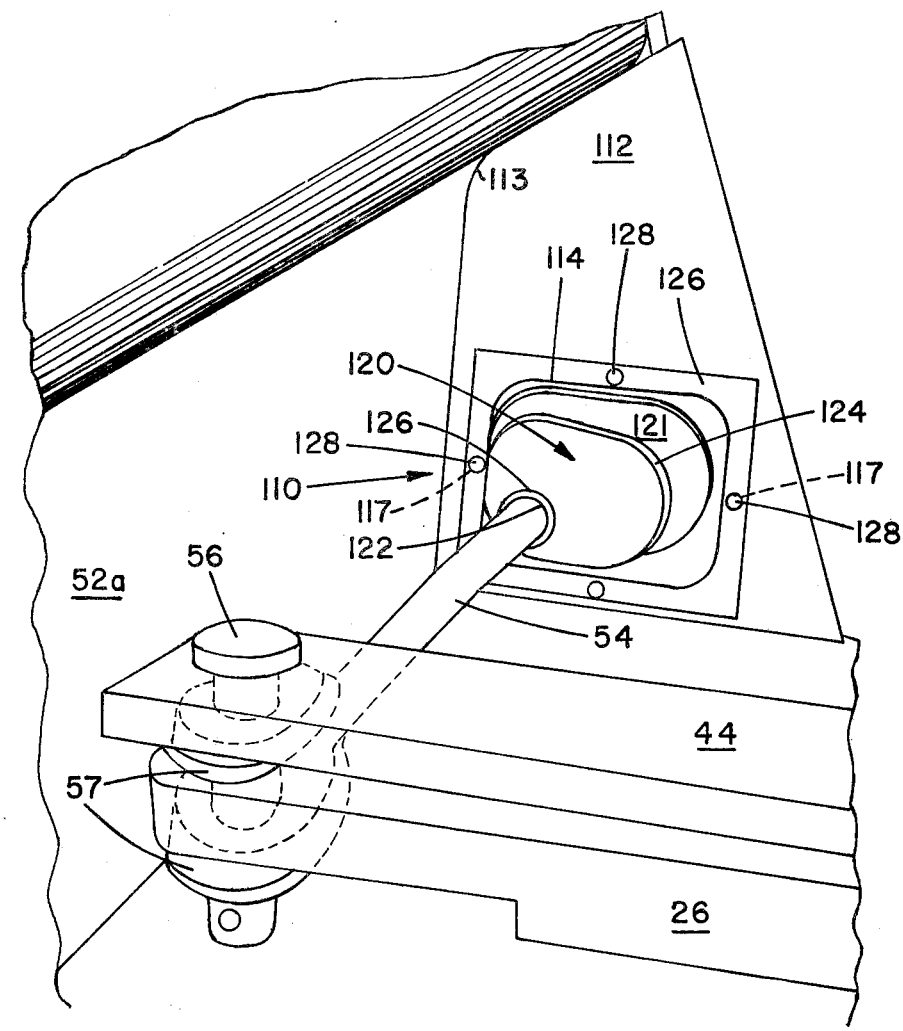
FIG. 8 is a perspective view of the elastomeric boot of the present invention.
Figure 9A:
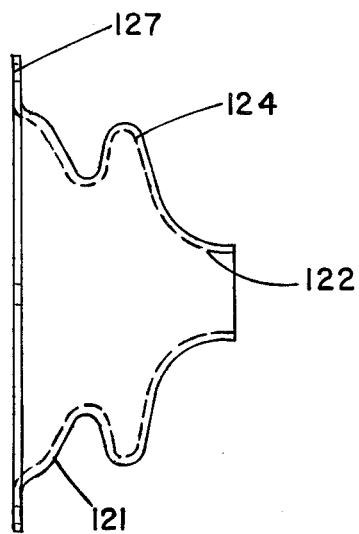
FIG. 9A is a plan view of the elastomeric boot shown in FIG. 9.
Figure 9B:
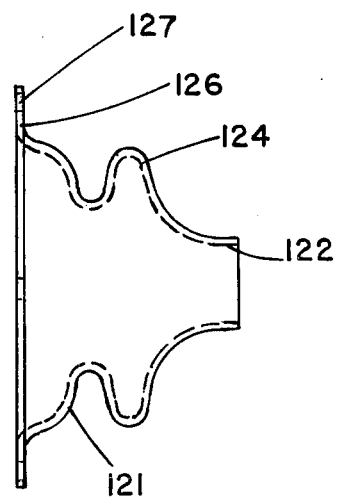
FIG. 9B is a side elevation view of the elastomeric boot shown in FIG. 9.
Figure 9:
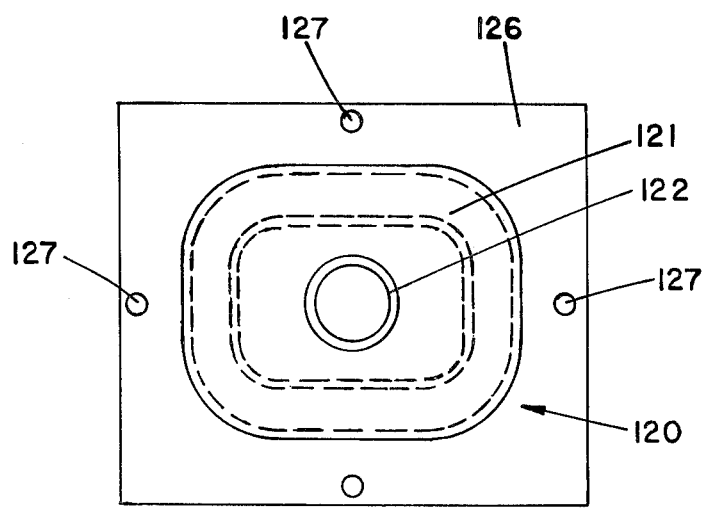
FIG. 9 is a front elevation of the elastomeric boot shown in FIG. 8.

In accordance with the present invention rain shields 50 and 60 are each replaced with an elastomeric boot assembly indicated generally at 110 in FIGS. 1 and 8. This assembly includes a mounting plate 112 which is contoured at 113 to follow the shape of side sill member 52a. Plate 112 is provided with an opening 114 through which brake rod 54 passes, and fastener openings 117. An elastomeric boot 120 is provided including a body portion 121 which covers opening 114 and extends longitudinally outward from side sill 52. Boot 120 is held in place by a mounting portion 126 having openings 127 for fasteners 128. Boot 120 includes an opening 122 through which brake rod 54 passes and includes one or more corrugations or pleats 124 (FIG. 9) to allow flexing of the boot as the brake rod moves longitudinally and laterally during application and release of the brakes. The opening 122 for the brake rod 54 is of sufficient size for the brake rod to pass through and engage to some degree brake rod 54. If brake rod 54 is about ⅞ inch in diameter, opening 122 may be about one (1) inch in diameter.

The elastomeric boot may be made of natural or synthetic rubber which is strong and rugged to withstand the railroad environment (temperatures from −50° F. to 120° F.) and withstand the movement of the brake rod relative to the boot during application and release of the brake. At the same time the elastomeric material should have sufficient flexibility and stretching capability that during installation of a new brake rod or during removal of the brake rod from within the side sill to inspect the brake rod, that after the pins 56 and 62 are removed out of the side sill and the brake rod 54 is free to move longitudinally out of the side sill, the fork portions 57 and 63, for example 2⅝ inches by 2⅜ inches, provided respectively at each end of the brake rod can be passed through the openings 122 by expansion of this opening, without permanent deformation occuring in the elastomeric boot. For this reason the elastomeric boot preferably has elongation of at least about 300%, has a Durometer value within the range of about 25 to about 50 A scale (tested per ASTM 2-BA-415-B13-C12-F17). Elastomeric material having a Durometer value in excess of 50 is too rigid to stretch sufficiently for the brake rod forks to pass through. Elastomeric materials having a Durometer value less than about 25 are too weak to withstand the hard service that their use as a brake rod boot will require.

Elastomeric materials having these properties are commercially available made from natural rubber and/or synthetic rubber. An example of one material found to be suitable is elastomeric material GI-2932, Geauga Industries, Box 127, Middlefield, Ohio 44062. Other suitable elastomeric materials will be apparent to those skilled in the art of the manufacture and sale of elastomeric material.

A significant cost savings is achieved by utilizing the elastomeric boot assembly of the present invention at each end of the side sill in constrast to the rain shields described above which must be fabricated and welded in place. Furthermore a savings in car weight is achieved since the elastomeric boot assembly is considerably lighter than rain shields 50 and 60, and side sill extensions 104, 104'.

It will be apparent from FIG. 8 that use of the elastomeric boot in accordance with the present invention also allows the elimination of the plates 104 at the ends of the car which extend between the slope sheet toward the respective car ends.

Thus with the elimination of the rain shields 50 and 60 and the elimination of plates 104 an even greater weight savings is achieved in accordance with the present invention.

It therefore is seen that both from a weight standpoint and from an economic standpoint the use of the elastomeric boot of the present invention is advantageous.

It will also be apparent that the elastomeric boot assembly of the present invention may be utilized in conjunction with a hollow center sill or in conjunction with a hollow structural member through which a brake rod is passed and wherein corrosion due to water in the sill or structural member is a problem.

What is claimed:

1. In a railway freight car brake system in which a brake rod passes through a hollow structural member, the improvement which comprises: an elastomeric boot attached to said structural member adjacent to an entrance to said structural member; said boot having a brake rod opening through which said rod passes in entering said structural member; said brake rod including at least one fork located at an end of the brake rod adjacent said entrance, said fork having a diameter larger than said brake rod; said boot engaging the brake rod sufficiently to substantially prevent moisture from passing through the boot and into said structural member; said boot being made of strong and rugged elastomeric material which has sufficient flexibility to allow said brake rod to move longitudinally and laterally during application and release of the brakes, and which has sufficient stretching capability to allow expansion of the brake rod opening sufficiently that said fork may pass through said brake rod opening temporarily deforming the elastomeric boot during disassembly of said brake system, whereby said brake rod opening will return to its original shape after said fork has passed through said brake rod opening.

2. A railway freight car brake system according to claim 1 wherein said boot comprises at least one pleat for flexing during application and release of said brake rod.

3. A railway freight car brake system according to claim 1 wherein said structural member is a railway car side sill.

4. A railway freight car brake system according to claim 3 wherein said brake rod includes forks located at opposite ends thereof.

* * * * *